(12) United States Patent
Haaser et al.

(10) Patent No.: US 7,707,902 B2
(45) Date of Patent: May 4, 2010

(54) APPARATUS FOR MEASURING BEARING THRUST LOAD

(75) Inventors: Frederic Gardner Haaser, Cincinnati, OH (US); Boris Kamentser, Fountain Valley, CA (US); Francisco Zul, Queretaro (MX); Eugenia Kamentser, Fountain Valley, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/197,012

(22) Filed: Aug. 22, 2008

(65) Prior Publication Data

US 2008/0307898 A1 Dec. 18, 2008

Related U.S. Application Data

(62) Division of application No. 11/352,635, filed on Feb. 13, 2006, now Pat. No. 7,430,926.

(51) Int. Cl.
*G01L 5/12* (2006.01)
(52) U.S. Cl. .............................. 73/862.49; 73/862.628; 73/862.637
(58) Field of Classification Search ...............................
73/862.627–862.634, 862.49; 177/211
See application file for complete search history.

(56) References Cited

U.S. PATENT DOCUMENTS

| 1,549,989 | A | * | 8/1925 | Kammerdiner | .......... 73/862.49 |
| 1,624,430 | A | * | 4/1927 | Parsons et al. | ........... 73/862.49 |
| 2,681,565 | A | * | 6/1954 | Kelk | ....................... 73/862.49 |
| 2,795,134 | A | | 6/1957 | Weber et al. | |
| 3,033,031 | A | * | 5/1962 | Gruber | ..................... 73/862.49 |
| 3,436,962 | A | * | 4/1969 | Laws | ...................... 73/862.392 |
| 3,722,264 | A | * | 3/1973 | Talmo et al. | .................. 73/769 |
| 3,763,700 | A | * | 10/1973 | MacDonald | ............. 73/862.49 |
| 3,953,920 | A | * | 5/1976 | Endo | .......................... 29/592.1 |
| 4,012,953 | A | * | 3/1977 | Ormond | ................ 73/862.624 |
| 4,064,744 | A | * | 12/1977 | Kistler | .................. 73/862.627 |
| 4,079,624 | A | * | 3/1978 | Kurtz | ..................... 73/862.636 |

(Continued)

FOREIGN PATENT DOCUMENTS

DE 3302732 A1 8/1983

(Continued)

OTHER PUBLICATIONS

EP Search Report; Reference 188932/12201; Application No./Patent No. 07102150.5-1236; Dated Jun. 6, 2007; 8 pgs.

*Primary Examiner*—Lisa M Caputo
*Assistant Examiner*—Jonathan Dunlap
(74) *Attorney, Agent, or Firm*—William Scott Andes, Esq.; Armstrong Teasdale LLP

(57) ABSTRACT

A bearing rotor thrust sensor assembly is provided for being secured to a bearing housing having a plurality of fingers extending between a pair of opposite portions of the housing. The assembly includes a first anchor member including a first cleat and configured to couple to a first housing portion of the pair of opposite housing portions, a second anchor member including a second cleat and configured to couple to a second of the pair of opposite housing portions, and a head sensor bracket positioned at least partially between the first and second anchor members. The head sensor bracket includes a load cell including a bridge circuit for producing a signal representative of forces on said cell.

11 Claims, 5 Drawing Sheets

U.S. PATENT DOCUMENTS

| | | | | |
|---|---|---|---|---|
| 4,142,408 | A | * | 3/1979 | Riazuelo .................. 73/862.49 |
| 4,242,864 | A | | 1/1981 | Cornett et al. |
| 4,268,220 | A | | 5/1981 | Malott |
| 4,419,901 | A | * | 12/1983 | Ruppert et al. ........... 73/862.49 |
| 4,589,291 | A | * | 5/1986 | Sander ................. 73/862.627 |
| 4,702,329 | A | * | 10/1987 | Click ........................ 177/211 |
| 4,733,571 | A | * | 3/1988 | Ormond ................ 73/862.632 |
| 4,789,035 | A | * | 12/1988 | Hamilton et al. ............ 177/211 |
| 4,872,767 | A | | 10/1989 | Knapp |
| 4,912,984 | A | * | 4/1990 | McMennamy et al. . 73/862.628 |
| 5,044,781 | A | * | 9/1991 | Werner ........................ 384/99 |
| 5,076,375 | A | * | 12/1991 | Dillon et al. ........... 73/862.627 |
| D345,517 | S | * | 3/1994 | Badcock ..................... D10/87 |
| 5,319,922 | A | | 6/1994 | Brantley |
| 5,385,013 | A | | 1/1995 | Barron et al. |
| 5,394,689 | A | | 3/1995 | D'Onofrio |
| 5,509,317 | A | * | 4/1996 | Gross ................... 73/862.632 |
| 5,622,045 | A | | 4/1997 | Weimer et al. |
| 5,735,666 | A | | 4/1998 | Johnston |
| 5,756,943 | A | * | 5/1998 | Naito et al. .................. 177/211 |
| 5,929,391 | A | * | 7/1999 | Petrucelli et al. ............ 177/211 |
| 6,105,439 | A | * | 8/2000 | Roger ..................... 73/862.49 |
| 6,360,616 | B1 | * | 3/2002 | Halliday et al. .......... 73/862.49 |
| 6,413,046 | B1 | * | 7/2002 | Penn et al. ..................... 416/1 |
| 6,417,466 | B2 | * | 7/2002 | Gross et al. ................. 177/211 |
| 6,422,088 | B1 | * | 7/2002 | Oba et al. ..................... 73/754 |
| 6,467,361 | B2 | * | 10/2002 | Rainey et al. .......... 73/862.637 |
| 6,540,483 | B2 | * | 4/2003 | Allmon et al. ................. 416/1 |
| 6,845,675 | B2 | * | 1/2005 | Meyer et al. ........... 73/862.041 |
| 6,976,396 | B2 | * | 12/2005 | Roe et al. ..................... 73/856 |
| 7,199,312 | B2 | * | 4/2007 | O'mahony et al. .......... 177/154 |
| 7,430,926 | B2 | * | 10/2008 | Haaser et al. ............ 73/862.49 |
| 2006/0218927 | A1 | * | 10/2006 | Singh et al. .................... 60/772 |

FOREIGN PATENT DOCUMENTS

JP   59163531   9/1984

* cited by examiner

APPARATUS FOR MEASURING BEARING THRUST LOAD

CROSS-REFERENCE TO RELATED APPLICATIONS

This application is a divisional of U.S. patent application Ser. No. 11/352,635, filed Feb. 13, 2006 now U.S. Pat. No. 7,430,926, which is hereby incorporated by reference and is assigned to assignee of the present invention.

BACKGROUND OF THE INVENTION

This invention relates generally to gas turbine engines and, more specifically to measuring a bearing thrust load on gas turbine engine bearing assemblies.

At least some known gas turbine engines include rotating compressors and turbines. The rotating compressors and turbines are supported within a case by bearing assemblies. During operation, thrust loads may be induced to the bearing assemblies that damage and/or reduce an operational life of such bearing assemblies. Accordingly, bearing thrust forces are sometimes monitored to determine if such forces are high enough to damage and/or reduce the operational life of such bearing assemblies.

Bearing thrust loads are sometimes measured using strain gages secured to races of the bearing assemblies. For example, the strain gages are sometimes calibrated in a laboratory and thereafter installed in the bearing races. At least some known bearing races may need to be reworked so that the gages can be securely engaged to the races. However, reworking bearing surfaces and calibrating each strain gage may be time consuming and difficult.

At least some known strain gage configurations for measuring bearing thrust loads include leadout wires that are routed through static structures of the gas turbine engine to a power source and measurement circuit. If the wires are incorrectly connected to the measurement circuit, the thrust readings can be reversed, i.e., the thrust load may be indicated as being in a direction opposite the direction of the actual thrust load. Also, with the above described strain gage configuration, the readout wires secured to the internal engine surfaces may work loose over time, possibly resulting in a loss of signal. In addition, the strain gage readout may be dependent upon temperature correction. To compensate for temperature affects on the gages, it may be necessary to mount temperature sensors in the region of the strain gages, which may add complexity to the installation and measurement.

BRIEF DESCRIPTION OF THE INVENTION

In one aspect, a bearing rotor thrust sensor assembly is provided for being secured to a bearing housing having a plurality of fingers extending between a pair of opposite portions of the housing. The assembly includes a first anchor member including a first cleat and configured to couple to a first housing portion of the pair of opposite housing portions, a second anchor member including a second cleat and configured to couple to a second of the pair of opposite housing portions, and a head sensor bracket positioned at least partially between the first and second anchor members. The head sensor bracket includes a load cell including a bridge circuit for producing a signal representative of forces on said cell.

In another aspect, a rotor bearing includes a housing and a bearing rotor thrust sensor assembly coupled to the housing without using an adhesive. The bearing rotor thrust sensor assembly includes a load cell including a bridge circuit for producing a signal representative of forces on the cell.

In another aspect, a method is provided for securing a bearing rotor thrust sensor assembly to a bearing housing having a plurality of fingers extending between a pair of opposite portions of the housing. The method includes coupling a head sensor bracket to a first and a second anchor member at least partially therebetween, positioning a first cleat of the first anchor member adjacent a first opening within a first housing portion of the pair of opposite housing portions, positioning a second cleat of the second anchor member adjacent a second opening within a second housing portion of the pair of opposite housing portions, and spreading the first and second anchor members apart such that the first cleat is received within the first opening, the second cleat is received within the second opening, and the first and second cleats each impart a force to the respective first and second housing portions to facilitate fixedly secure the assembly to the bearing housing.

DETAILED DESCRIPTION OF THE INVENTION

Figure 1:
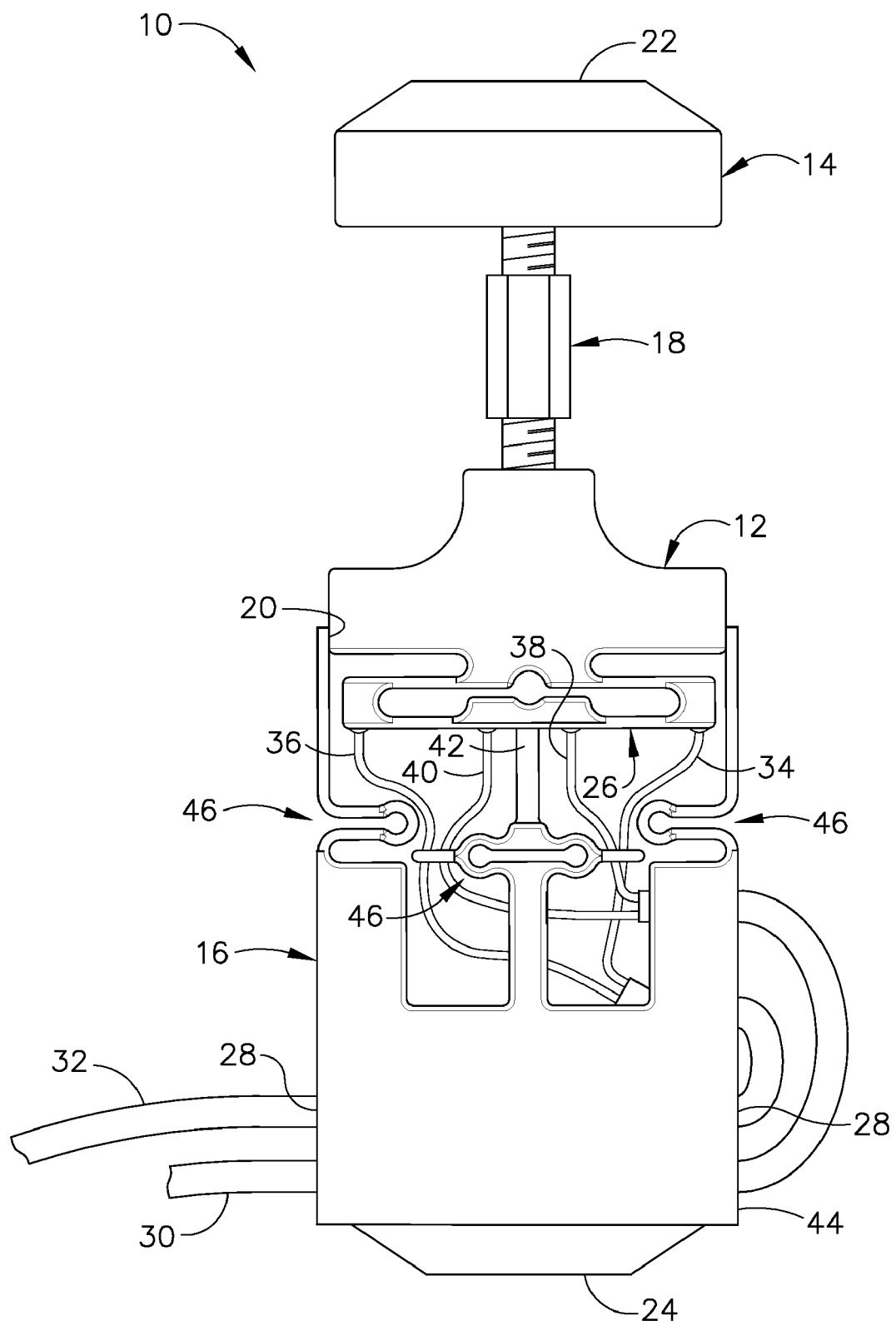
FIG. 1 is perspective view of an exemplary embodiment of a bearing rotor thrust sensor assembly.

FIG. 1 is a perspective view of an exemplary embodiment of a bearing rotor thrust sensor assembly 10. Assembly 10 mounts to a bearing housing (not shown in FIG. 1) and includes a head sensor bracket 12 positioned at least partially between a pair of anchor members 14 and 16. More specifically, head sensor bracket 12 is coupled to anchor members 14 and 16 at least partially therebetween. In the exemplary embodiment, head sensor bracket 12 is coupled to anchor member 14 via a turnbuckle 18, and bracket 12 is received within an opening 20 of anchor member 16 and coupled thereto using any suitable structure and/or means, such as, but not limited to welding. Turnbuckle 18 changes a distance between anchor members 14 and 16 to facilitate securing assembly 10 to the bearing housing, as will be described in more detail below. Assembly 10 may mount to the bearing housing in any suitable configuration, arrangement, fashion, and/or by any suitable structure and/or means. For example, in the exemplary embodiment, each anchor member 14 and 16 includes a respective cleat 22 and 24 extending outwardly therefrom for reception within a corresponding opening (not shown in FIG. 1) within the bearing housing, as will be described in more detail below. Although each anchor member 14 and 16 is illustrated as including only one cleat 22 and 24, respectively, each anchor member 14 and 16 may include any number of cleats 22 and 24, respectively, for reception within any number of openings in the bearing housing. In the exemplary embodiment, head sensor bracket 12 is hollow so that it facilitates reducing a reduced mass as compared to a solid bracket and facilitates reducing vibration response and loading during operation.

Head sensor bracket 12 includes a load cell 26, which is sometimes referred to herein as a sensing element. In some embodiments, load cell 26 is coupled to bracket 12 using any suitable structure and/or means, such as, but not limited to, welding and/or using threaded fasteners. In other embodiments, load cell 26 is integrally formed with bracket 12. Load cell 26 is fabricated from a metallic substrate with a screen printed thick film pattern of multiple layers. Although load cell 26 may be fabricated from any suitable metallic substrate, in some embodiments load cell 26 includes steel, such as, but not limited to 4340 alloy steel. In some embodiments, load cell 26 is coated with a corrosion protective coating and includes a strain gage bridge, a temperature sensor, and fault protection, as described below. Generally, load cell 26 has a double cantilever head configuration with strain sensing material between both cantilever supports.

In the exemplary embodiment, anchor member 16 includes an opening 28 for containing a portion of a pair of wire cables 30 and 32 that each include a twisted pair of wires 34, 36, 38, and 40, respectively. Wires 34 and 36 are soldered to load cell 26 and provide an excitation voltage to load cell 26. Wires 38 and 40 are also soldered to load cell 26 and carry the cell output to a sensing circuit (not shown in FIG. 1). In some embodiments, one or more solder joints between load cell 26 and wires 34, 36, 38, and 40 is covered with epoxy in order to impart a greater resistance to handling and vibration damage.

A pushrod 42 extends from a body 44 of anchor member 16 and into contact with load cell 26. As such, pushrod 42 is positioned to impart a force to on load cell 26 to, for example, provide the desired pre-load on load cell 26 and/or deflect load cell 26 during axial movement of the bearing housing, which will be described in more detail below. In some embodiments, a position of pushrod 42 is adjustable relative to a body 44 of anchor member 16 to facilitate adjusting the pre-load on load cell 26. Anchor member 16 also includes one or more springs 46 that facilitate relative movement between head sensor bracket 12 and pushrod 42. Springs 46 may also facilitate providing that the amount of axial motion imparted by pushrod 42 to load cell 26 can be maintained to within the movement capability of load cell 26. Although springs 46 may each include any suitable shape, in the exemplary embodiment springs 46 are shaped as illustrated herein.

Figure 2:
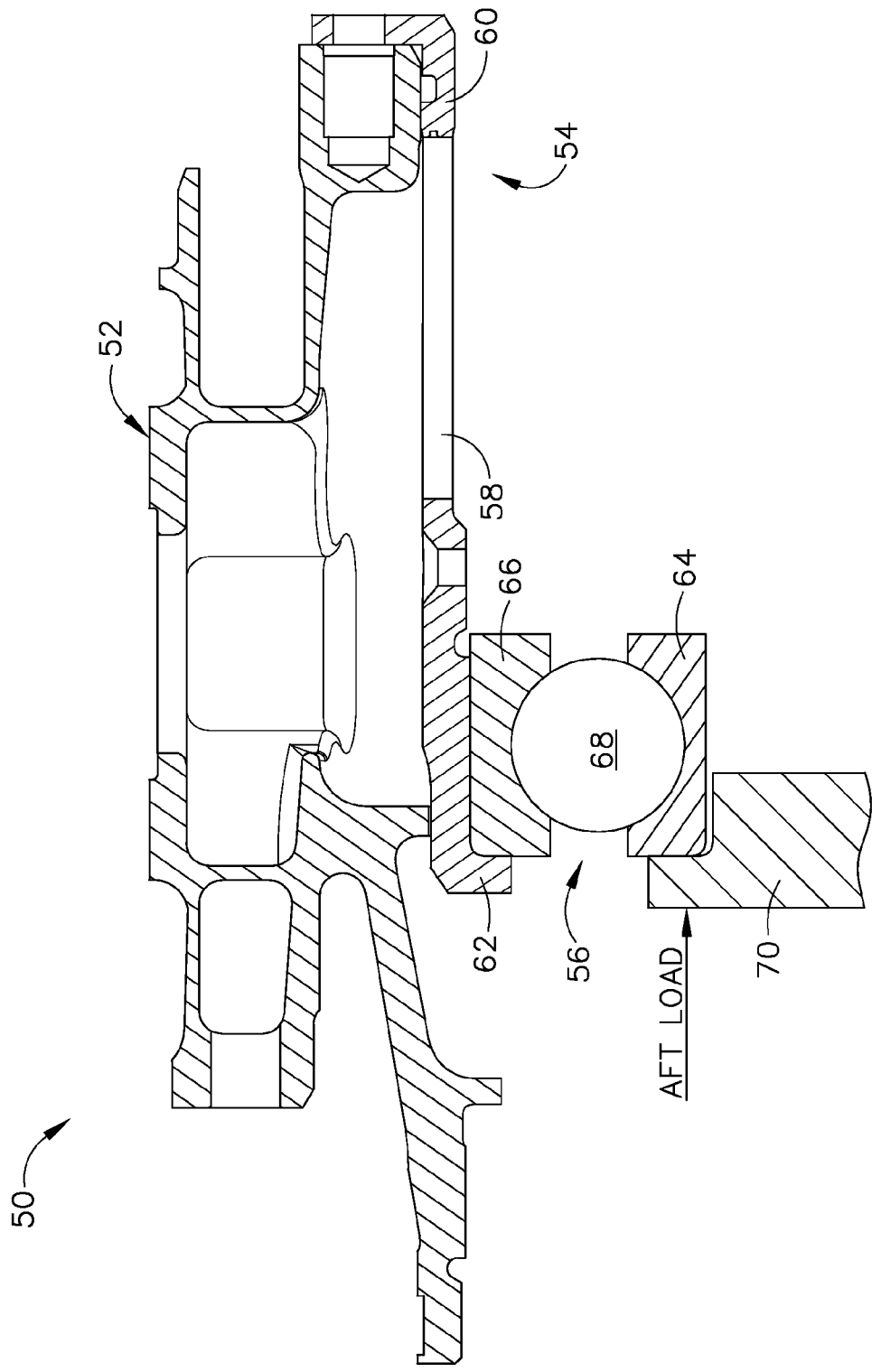
FIG. 2 is a side view of an exemplary engine bearing in which the assembly shown in FIG. 1 may be utilized.

FIG. 2 is an isometric side view, partially in cross section and with parts cut away, of an exemplary engine bearing housing 50 in which assembly 10 (shown in FIG. 1) may be utilized. Bearing housing 50 includes a sump housing 52 and a bearing support bracket 54 extending from sump housing 52 to support a bearing assembly 56. A plurality of finger supports 58, sometimes referred to herein as fingers, extend between portions 60 and 62 of bracket 54. Only one such finger 58 is shown in FIG. 2. Bearing assembly 56 includes an inner race 64 and an outer race 66, and a ball bearing 68 is positioned between races 64 and 66. A rotating component 70 is secured to inner race 64 and as component 70 and inner race 64 rotate, loads (e.g., an aft load force direction is shown in FIG. 2) are exerted on bearing assembly 56. In some embodiments, a plurality of guides (not shown) are located around the circumference of bearing housing 50 to provide guidance for wire cables 30 and 32.

Figure 3:
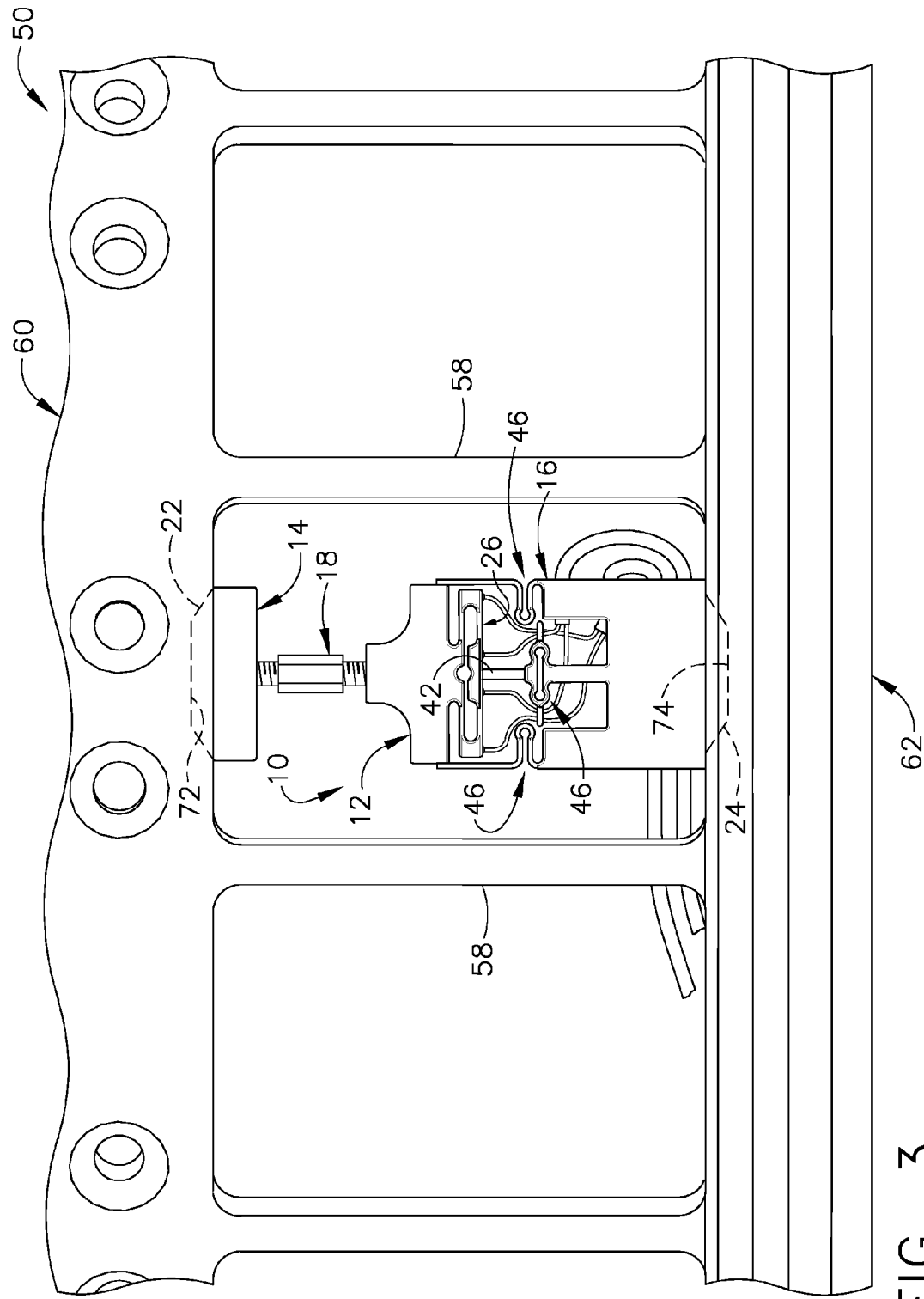
FIG. 3 is a perspective view of the bearing rotor thrust assembly shown in FIG. 1 secured to the bearing shown in FIG. 2.

FIG. 3 is a perspective view of bearing rotor thrust assembly 10 secured to bearing housing 50. Assembly 10 may mount to the bearing housing in any suitable configuration, arrangement, fashion, and/or by any suitable structure and/or means. In the exemplary embodiment assembly 10 is secured to housing 50 between adjacent fingers 58 and such that assembly 10 is generally parallel to housing fingers 58. Specifically, cleat 22 is positioned adjacent an opening 72 within bearing housing portion 60, and cleat 24 is positioned adjacent an opening 74 within bearing housing portion 62. Using turnbuckle 18, anchor members 14 and 16 are then spread apart such that cleat 22 is received within opening 72, cleat 24 is received within opening 74, and cleats 22 and 24 each impart a force to bearing housing portions 60 and 62, respectively, to facilitate fixedly securing assembly 10 to bearing housing 50.

As bearing housing 50 is put into either tensile or compressive loading, an axial dimension of housing 50 is changed, for example from about 0 to +/− about several mils. Pushrod 42 moves with this axial dimensional change of bearing housing 50, and as pushrod 42 moves, the loading (or deflection imparted) on load cell 26 also changes. By sensing the deflection changes on load cell 26, the loading on bearing housing 50 can be determined. Springs 46 facilitate relative movement between pushrod 42 and head sensor bracket 12, and therefore load cell 26. Springs 46 may also facilitate providing that the amount of axial motion imparted by pushrod 42 to load cell 26 can be maintained to within the movement capability of load cell 26.

Figure 4:
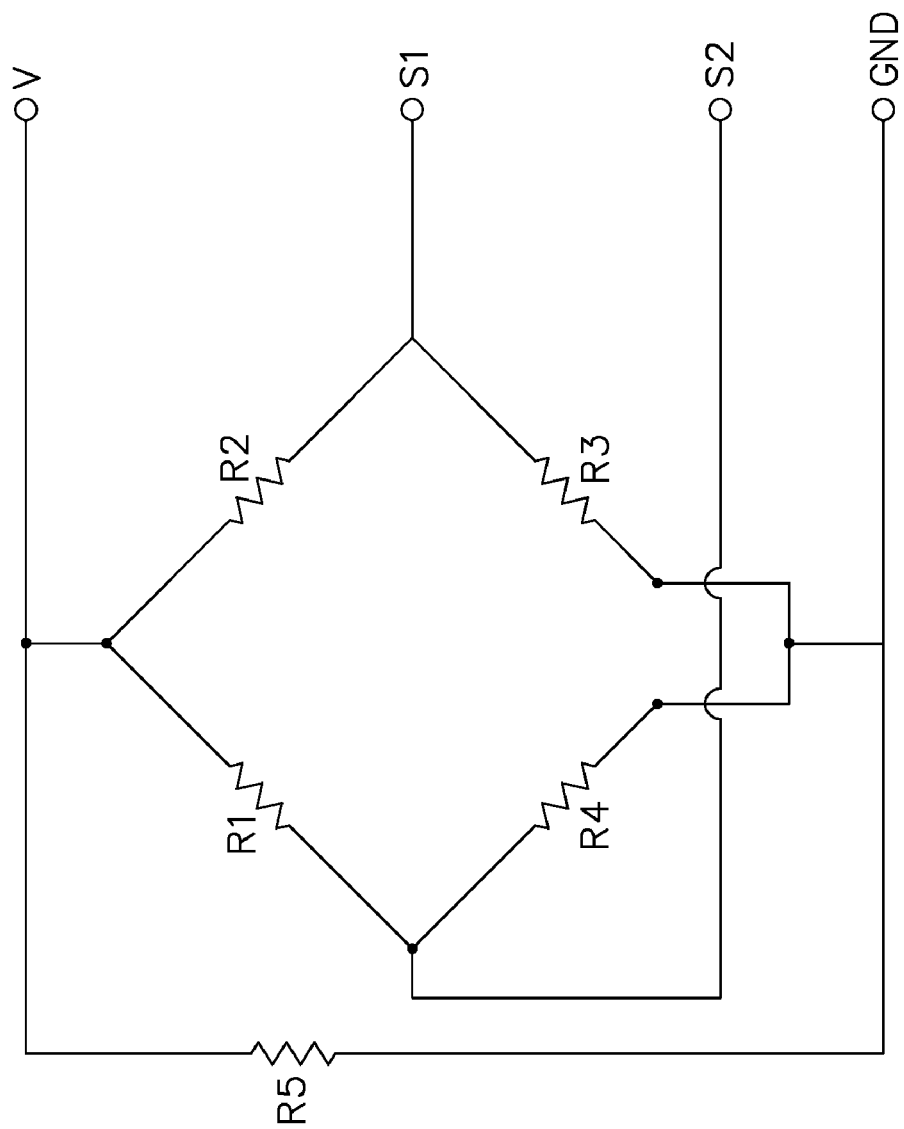
FIG. 4 is a circuit schematic diagram of an exemplary embodiment of a load cell for use with the sensor assembly shown in FIG. 1.

FIG. 4 is a circuit schematic diagram of an exemplary embodiment the electrical circuit, or conducting paths, integrally fabricated with load cell 26. Particularly, load cell 26 is fabricated from a metallic substrate with a screen printed thick film pattern of multiple layers. Cell 26 is coated with a corrosion protective coating and including a strain gage bridge, a temperature sensor, and fault protection. The specific metallic substrate selected may depend upon the environment in which cell 26 is to be used. For example, in a gas turbine engine, the typical temperature of the oil at the bearings is about 300 degrees Fahrenheit during running, with a potential for the oil to heat up to about 320 degrees Fahrenheit when the heat exchanger is not operating during shutdown. To compensate for temperature variations, one layer of cell 26 may be a platinum thermocouple. Such load cells are commercially available from Bokam Engineering Inc. 3633 MacArthur Blvd., Suit 412, Santa Ana, Calif. 92704.

Cell 26 includes a Wheatstone bridge formed by resistors R1, R2, R3, and R4. A voltage signal is supplied to the bridge by a voltage line V coupled to the junction between resistors R1 and R2. Resistors R3 and R4 are coupled to a ground line GND. Output signals are provided on lines S1 and S2 which are connected to the junctions between resistors R1, R4 and R2, R3, respectively. Resistor R5 is connected in series with voltage line V and ground line GND.

As is known, and in operation, as the strain on load cell 26 varies, the resistances of resistors R1, R2, R3, and R4 varies. As a result, if bridge is balanced under no load (or if pre-loaded to a selected force), when other forces act on bridge, bridge becomes unbalanced as indicated by signals on lines S1 and S2. The signals on lines S1 and S2 are representative of the force acting on cell 26. If the forces become excessive and result in breaking the conducting path, or vias, coupled to resistor R5, such a condition is indicated by the signals on lines V and GND. Therefore, by monitoring such lines V and GND, a fault condition can be detected. With respect to compensation for varying temperature conditions, and as described above, a layer of cell 26 may be a platinum thermocouple. By connecting such layer to output lines S1 and S2, the signals on lines S1 and S2 also are representative of temperature conditions at cell 26.

When coupling cell 26 to the measuring circuit which receives signals on lines S1 and S2, and in coupling cell lines V and GND to a power supply, it may be important to ensure good electrical connections are formed and that such connections can withstand the high temperature operating environment. The measuring circuit and power supply coupled to a load cell in a manner sufficient to withstand the high temperature operating environment in a gas turbine engine are commercially available from Bokam Engineering Inc. 3633 MacArthur Blvd., Suit 412, Santa Ana, Calif. 92704.

With respect to load cell 26, only four external wires (e.g., wires 34, 36, 38, and 40) may need be coupled to such cell 26. By having only four external wires with cell 26, the number of wires required with the present sensor assembly is reduced as compared to the number of wires required with known strain gages. Reducing the number of wires is believed to improve reliability by means of fewer circuits. In addition, with the above described load cell, since temperature compensation is performed within the cell, the requirement for external temperature sensors mounted in the region of the strain gages is believed to be eliminated. Eliminating the need for such external temperature sensors is believed to further simplify installation and operation of the present sensor assembly.

Figure 5:
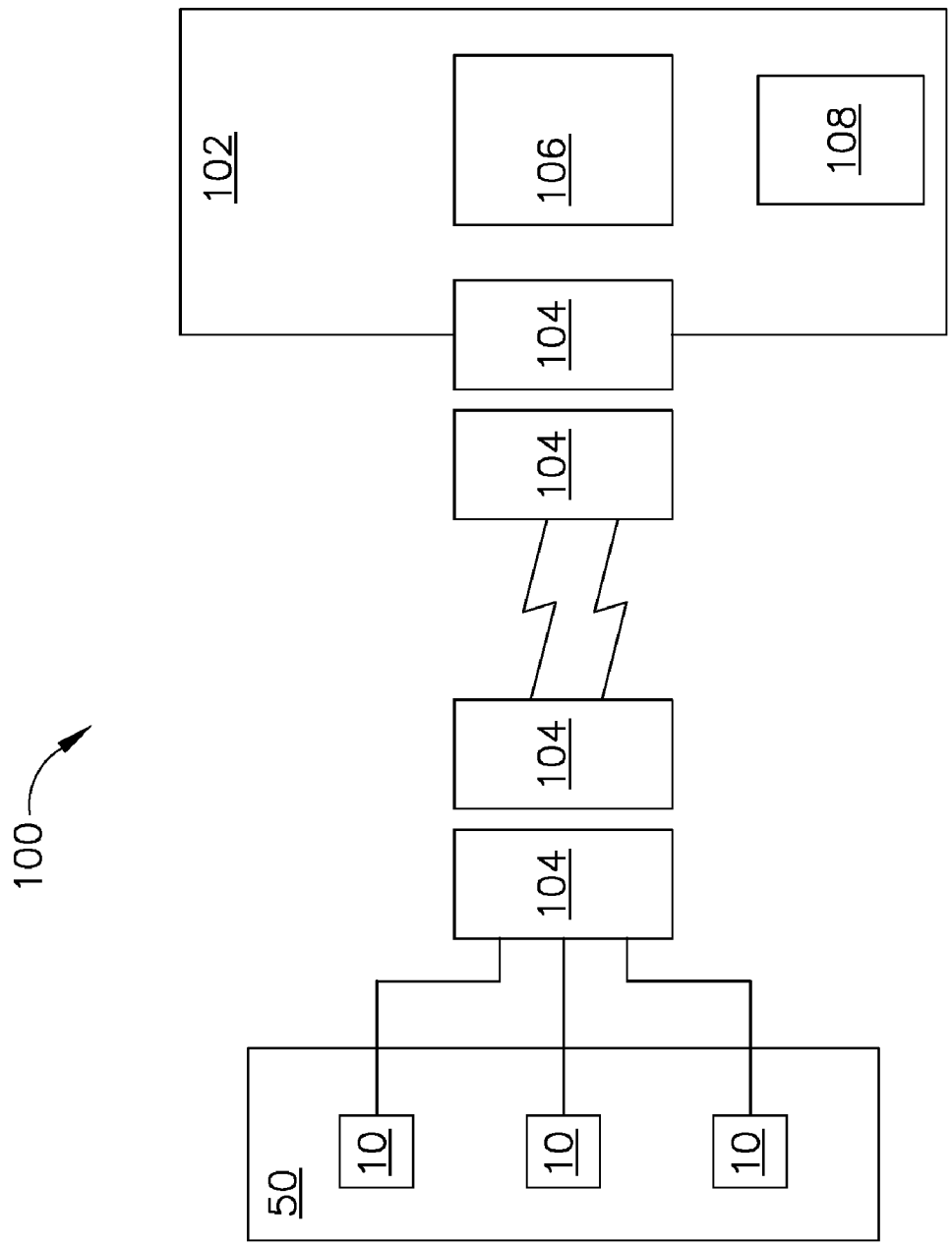
FIG. 5 is a schematic block diagram of an exemplary embodiment of sensing circuit for use with the sensor assembly shown in FIGS. 1 and 3.

FIG. 5 is a schematic block diagram of an exemplary embodiment of sensing circuit 100 for use with assembly 10. Circuit 100 includes a plurality of sensor assemblies 10 electrically coupled to signal conditioning electronics 102 located off-board the engine (not shown) via a plurality of connectors 104. Although three assemblies 10 are illustrated, bearing housing may have any number of assemblies 10 secured thereto. In the exemplary embodiment, signal conditioning electronics 102 read a micro strain measurement of each assembly 10 as a voltage. Signal conditioning electronics 102 may include a control panel 106 for generally controlling operation thereof and for reading the voltage measurements. In some embodiments, signal conditioning electronics 102 include a chart 108, for example mounted thereon or located adjacent to, for converting voltage to strain. Although signal conditioning electronics may have other gains, in some embodiments signal conditioning electronics include a gain of between about twenty to one and about thirty to one.

As described above, sensor assembly 10 can be utilized for measuring bearing thrust loads in a gas turbine engine and may be less difficult and/or time-consuming to install in both development and production engines as compared to known strain gage assemblies. For example, because sensor assembly 10 is mounted directly to bearing housing 50 rather than to bearing races, the need for reworking the bearing races to install sensors may be eliminated. Moreover, sensor assembly 10 may be secured to bearing housing 50 without using an adhesive. As such, sensor assembly 10 may facilitate reducing the time and/or costs associated with measuring bearing thrust loads.

The assemblies, bearings, and methods described and/or illustrated herein are described and/or illustrated herein in connection with a specific assembly for being secured to a bearing housing of a gas turbine engine. However, it should be understood, that such sensing elements could be used in many alternative securing arrangements. Therefore, the manner of securing the sensing element to the bearing housing is an exemplary configuration and the sensing element could be used in connection with other securing assemblies.

Exemplary embodiments of assemblies, bearings, and methods are described and/or illustrated herein in detail. The assemblies, methods, and bearings are not limited to the specific embodiments described and/or illustrated herein, but rather, components of each assembly and bearing, as well as steps of each method, may be utilized independently and separately from other components and/or steps described and/or illustrated herein. Each component and/or step can also be used in combination with other components and/or steps.

Each of cleats 22 and/or 24 may be referred to herein as a first and/or a second cleat. Each of anchor members 14 and 16 may be referred to herein as a first and/or a second anchor member. Each of bearing housing openings 72 and/or 74 may be referred to herein as a first and/or a second opening.

When introducing elements/components/etc. of the assemblies, bearings, and methods described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A rotor bearing comprising:
    a housing comprising a first receptacle and a second receptacle positioned radially outward from said first receptacle; and
    a bearing rotor thrust sensor assembly coupled to said housing via a first cleat received within said first receptacle and a second cleat received within said second receptacle, said bearing rotor thrust sensor assembly comprising a load cell comprising a bridge circuit for producing a signal representative of forces on said cell.

2. A bearing in accordance with claim 1 wherein said rotor bearing comprises a gas turbine engine rotor bearing.

3. A bearing in accordance with claim 1 wherein said load cell comprises a metallic load cell.

4. A bearing in accordance with claim 1 wherein said load cell comprises a plurality of layers of material, at least one of said layers comprising a thermocouple.

5. A bearing in accordance with claim 4 wherein said load cell comprises a fault protection circuit.

6. A bearing in accordance with claim 1 further comprising signal conditioning electronics electrically coupled to said load cell, said signal conditioning electronics configured to read a micro strain measurement of said load cell as a voltage, said signal conditioning electronics comprising a chart for converting voltage to strain.

7. A bearing in accordance with claim 6 wherein said rotor bearing comprises a rotor bearing for a gas turbine engine and said signal conditioning electronics are off-board the gas turbine engine.

8. A bearing in accordance with claim 6 wherein said signal conditioning electronics comprises a lookup table for converting voltage to strain.

9. A bearing in accordance with claim 1 wherein said load cell comprises a double cantilever head configuration comprising a first and a second cantilever support, said load cell further comprising a strain sensing material between both cantilever supports.

10. A bearing in accordance with claim 9 wherein said load cell is fabricated from a metallic substrate with a screen printed thick film pattern of multiple layers.

11. A bearing in accordance with claim 9 wherein said bearing rotor thrust sensor assembly comprises a pushrod that extends from a body of an anchor member and into contact with said load cell such that said pushrod is positioned to impart a force onto said load cell to at least one of provide a desired pre-load on said load cell and deflect said load cell during axial movement of said bearing housing.

* * * * *